INVENTOR.
Edward P. Vollertsen
BY Louis Burgess
attorney

Patented Oct. 5, 1954

2,690,986

UNITED STATES PATENT OFFICE 2,690,986

PROCESS FOR REPAIRING LEAKY WOOD BARRELS

Edward P. Vollertsen, Georgetown, Ky., assignor to National Distillers Products Corp., a corporation of Virginia Application December 1, 1950, Serial No. 198,595

5 Claims. (Cl. 154—104)

This invention is a new and useful process for repairing leaky wood barrels and particularly those containing liquid contents. The invention will be fully understood from the following description read in conjunction with the drawings in which.

Figure 1:
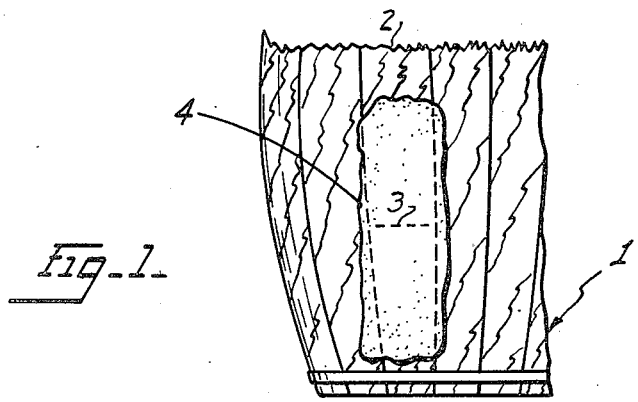
Fig. 1 is a plan view of a barrel with parts cut away showing the first stage of my method.
Figure 2:
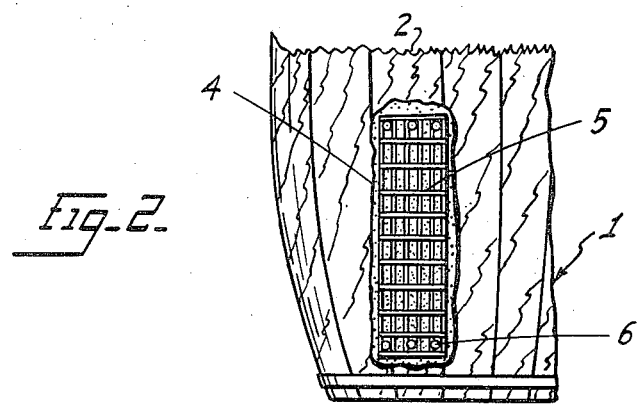
Fig. 2 is a similar view of a barrel showing the second stage of my method.
Figure 3:
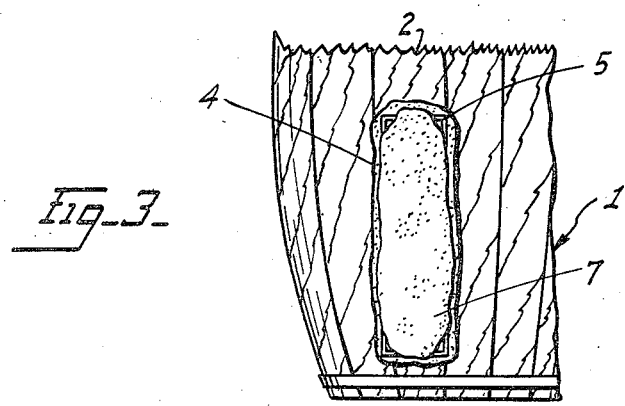
Fig. 3 is a similar view of a barrel showing the third and final stage of my method.

In actual practice where barrels containing liquids are stored or in transit, the presence of a leak is made evident by the fact that some of the contents escapes through the leak, thereby forming a wetted area or leaving a residue at this point. In the application of my method it is advisable that such barrels be first oriented in a position in which the liquid can no longer escape through the leak and the area surrounding the leak has had ample time to dry. Following this, this area is then carefully cleaned by scraping to develop the clean surface of the underlying wood, and if the edges of the crack are bulged or uneven, the entire area should be leveled and smoothed.

I then prepare a semi-solid mass of sawdust disseminated in a solution of self-setting cement. Preferably the sawdust is of the same wood as that of which the barrel is composed, and preferably it is carefully sifted to eliminate dust and powder, leaving only clean granular particles. The sifting may be done on a screen of about 30 mesh. In general, I may use any self-setting cement and if the liquid contents of the barrel are predominantly aqueous, I prefer an aqueous solution of self-setting cement. A suitable cement for this purpose is an aqueous solution of a formaldehyde-urea reaction product containing as setting agent the ammonium salt of an inorganic acid and which may also contain an agent, such as a mineral oxide adapted to control the rate of hardening, i. e., to produce a delayed hardening. I preferably work with a dry granular cement containing dry formaldehyde-urea reaction product, ammonium chloride, and a metal oxide or hydroxide. In carrying out the method I add one volume of such a cement to an equal volume of clean dry sawdust and thoroughly mix the same, following which I add to the mixture one volume of water. The mixture is then allowed to stand about 10 minutes, following which, and at any time before actual hardening sets in, the mixture is ready for use.

Assuming, for example, that wood barrel 1 has developed a leak in stave 2, for example at the place indicated by line 3, and the surface adjacent such leak has been permitted to dry and has been cleaned, I apply to this surface a layer 4 of the mixture referred to. This layer is carefully worked to insure that it makes contact with and wets the wood in the entire area surrounding the leak. The thickness of the applied layer may run from $\frac{1}{8}$ to $\frac{1}{2}$ inch and preferably is of the order of $\frac{1}{4}$ inch in thickness.

Immediately following the application of this layer 4 I apply to the surface of the same a metal grid or screen 5. This screen is worked into the layer and is secured to the wood of the barrel. The screen may for example be composed of expanded metal having individual ribs about 1 inch long and approximately $\frac{1}{16}$ of an inch apart and be secured to the wood of the barrel by means of tacks 6. A perforated metal having the perforations closely spaced or a piece of woven screening of from 16 to 4 mesh may be similarly used. In the third step of my method I apply to the surface of the layer 4 and to the surface of the screen 5, which is imbedded therein, a further layer 7 of the semi-solid mixture referred to.

Following this it is only necessary that the barrel be left standing in a position in which the liquid contents do not reach the area of the leak until the self-setting cement has hardened. It will ordinarily harden completely within the period of a couple of hours, following which the barrel may be placed in any position without loss of its liquid contents.

The foregoing specific description is for purposes of illustration and not of limitation and it is therefore my intention that the invention be limited only by the appended claims or their equivalents wherein I have endeavored to claim broadly all inherent novelty.

I claim:

1. Method of repairing leaky wood barrels which comprises applying to the surface of such a barrel in the area surrounding such a leak a first layer of sawdust disseminated in a solution of self-setting cement to form a semi-solid mixture, securing to the said barrel overlaying said first layer a flat metal grid, and applying to the said grid and the said outer surface of said first layer a second layer of said mixture.

2. Method according to claim 1 in which said grid is composed of slots of not exceeding $\frac{3}{16}''$ in width.

3. Method of repairing leaky wood barrels which comprises applying to the surface of such a barrel in the area surrounding such a leak a first layer of sawdust disseminated in an aqueous solution of self-setting cement to form a semi-solid mixture, securing to the said barrel overlaying said first layer a flat metal grid, and applying to the said grid and the said outer surface of said first layer a second layer of said mixture.

4. Method according to claim 3 in which said cement is an aqueous solution of a formaldehyde-urea reaction product containing a hardening agent.

5. Method according to claim 3 in which said grid is composed of slots of not exceeding $\frac{3}{16}''$ in width.

References Cited in the file of this patent

UNITED STATES PATENTS

| Number | Name | Date |
| --- | --- | --- |
| 1,767,421 | Wirth | June 24, 1930 |
| 2,290,946 | Dearing et al. | July 28, 1942 |
| 2,304,263 | Luty | Dec. 8, 1942 |
| 2,399,489 | Landes | Apr. 30, 1946 |
| 2,419,614 | Welch | Apr. 29, 1947 |

FOREIGN PATENTS

| Number | Country | Date |
| --- | --- | --- |
| 869,029 | France | Oct. 29, 1941 |